United States Patent [19]

De Goncourt

[11] Patent Number: 4,773,631
[45] Date of Patent: Sep. 27, 1988

[54] MOUNTING DEVICE FOR A RESILIENT LEAF MADE OF A COMPOSITE MATERIAL WORKING IN FLEXURE

[75] Inventor: Louis De Goncourt, Voisins-Le-Bretonneux, France

[73] Assignee: Bertin & Cie, Plaisir, France

[21] Appl. No.: 889,129

[22] Filed: Jul. 24, 1986

[30] Foreign Application Priority Data

Aug. 7, 1985 [FR] France .................. 85 12079

[51] Int. Cl.⁴ ............................................ B60G 11/02
[52] U.S. Cl. .................................. 267/47; 267/41; 267/148
[58] Field of Search .................. 267/47, 148, 149, 41; 280/669, 699, 719

[56] References Cited

U.S. PATENT DOCUMENTS

| 3,056,706 | 10/1962 | Knoppel | 267/148 X |
| 4,414,049 | 11/1983 | Jones | 267/148 X |
| 4,475,723 | 10/1984 | Meyer | 267/47 |
| 4,557,500 | 12/1985 | Collard et al. | 267/47 X |
| 4,565,356 | 1/1986 | Nickel | 267/148 X |
| 4,659,071 | 4/1987 | Woltron | 267/47 X |

FOREIGN PATENT DOCUMENTS 1347547  2/1963  France .................. 267/47

Primary Examiner—Dave W. Arola
Attorney, Agent, or Firm—A. W. Breiner

[57] ABSTRACT

Mounting device for a resilient leaf made of a composite material working in flexure having in its vertical plane of symmetry and over at least a part of its length, a thickness increasing towards one of its ends, and in its horizontal plane, a width decreasing towards the same end, the thicker end having an opening capable of cooperating with mounting means, comprising at least one loop (3) formed at the thick end of the leaf and at least one supporting member (12) having an at least partially cylindrical supporting surface (6, 7) cooperating with at least a part of the faces of the loop, the generatrices of the supporting surfaces being parallel to the axis of the loop.

13 Claims, 2 Drawing Sheets

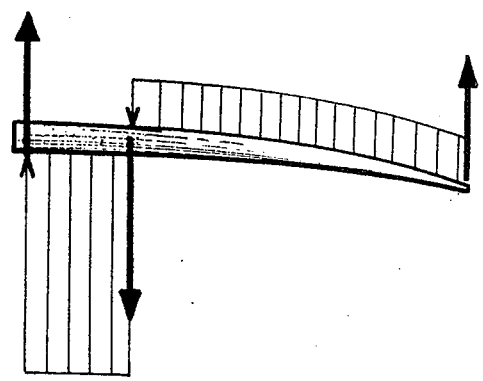
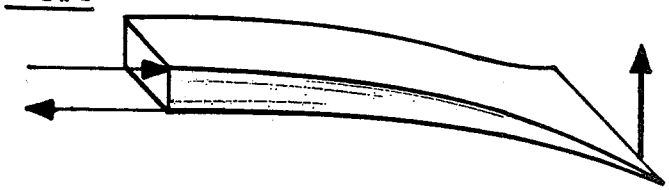
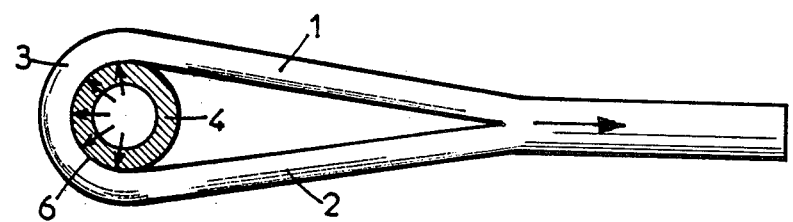
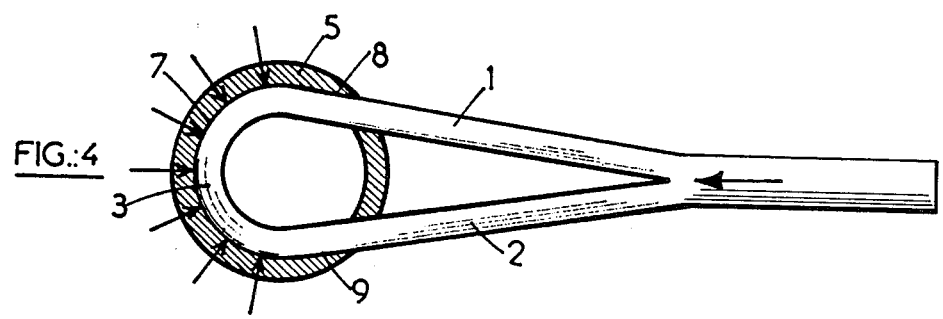

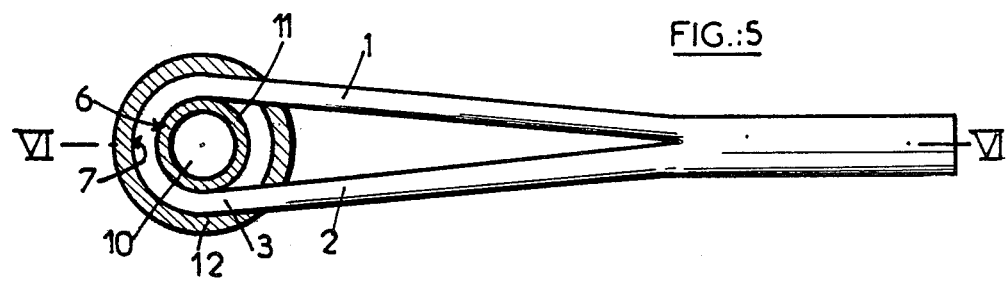
FIG.:5
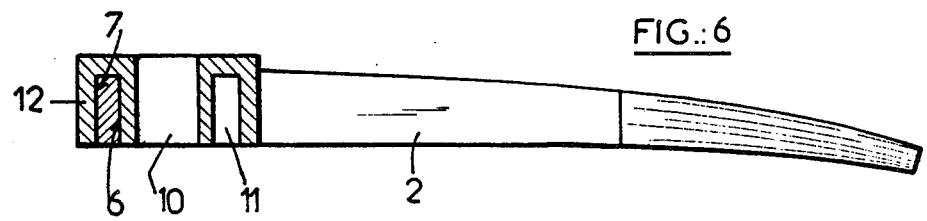
FIG.:6
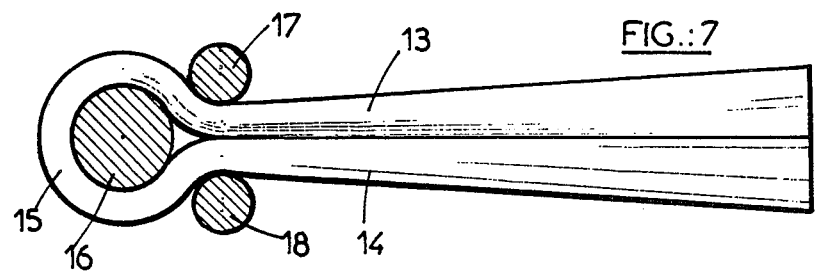
FIG.:7
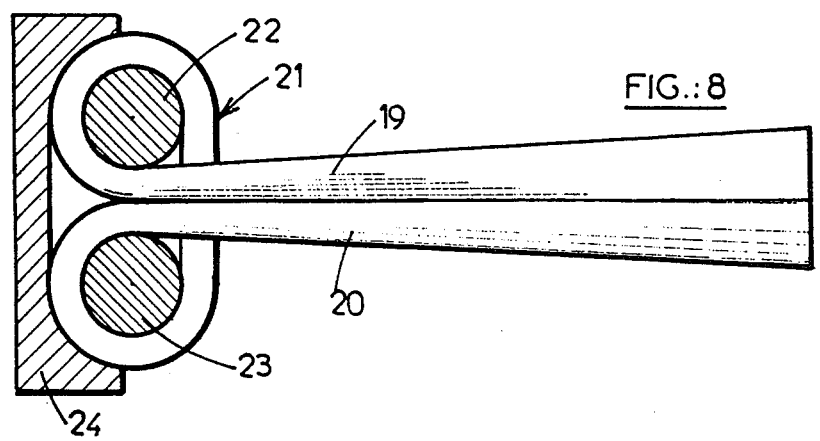
FIG.:8

MOUNTING DEVICE FOR A RESILIENT LEAF MADE OF A COMPOSITE MATERIAL WORKING IN FLEXURE

The invention relates to a mounting device for a resilient leaf made of a composite material working in flexure and especially a spring of the "leaf spring" type having in its vertical plane of symmetry and over at least a part of its length, a thickness increasing towards one of its ends, and in its horizontal plane, a width decreasing towards the same end, the thicker end having an opening capable of cooperating with mounting means.

Such a leaf is known, for example, from French Patent No. 2,516,455 and has, in its vertical plane of symmetry and over at least a part of its length, a thickness increasing towards one of its ends, and in its horizontal plane, a width decreasing towards the same end. This leaf is used as suspension for a vehicle and at its thick end carries a connection with a wheel support. This connection consists of a tubular metal insert fixed in the end and internally comprising a seat on which there sits the spherical end of a steering-knuckle pivot which consequently has two degrees of freedom, lengthwise and crosswise, relative to the spring. As a result of the relative freedom of the wheel support mounted on a spherical joint, the spring is subject to no major shear stresses related to a moment or mounting.

When a leaf such as this is used in a mounting which is to have only a single degree of freedom, corresponding, for example, to its rotation around a pivot passing through its end, severe problems are encountered, due to the introduction of unacceptable shear stresses which lead to rapid delaminations of the composite and to considerable hammering pressures. Such problems would be encountered if it were intended, for example in French Patents Nos. 1,570,587 and 2,165,317, to replace metal leaf springs with a composite leaf. In fact, the stabilizing device for road camping cars and trailers which is described therein comprises two leaf springs arranged, in their horizontal plane, along the tow-bar of the towed vehicle, held at their thick end to the coupling plate by two axles which pass through them vertically and at their thin end by the movable end of a leaf screw jack attached to the tow-bar. The end of the towbar is usually attached to the coupling ball of the towing vehicle, arranged between the two spring-supporting axles. A braking device is provided between the spring and the axle to restrict rotation in the horizontal plane. The thick end of the spring behaves as a rigid bar having a single degree of freedom in the horizontal plane. Shear stresses produced in the vertical plane are transmitted, without any major problem, from the metal spring to the axle and from there to the vehicle chassis.

The stabilizing device described above is, therefore, in the form of a set of two springs which are at one end fixed, via the brake, to axles maintained on the coupling plate by means of pins, and at the other end to the jack which is coupled to the tow-bar of the towed vehicle. When the trailer is being coupled up or uncoupled, this axle/spring/jack assembly must either be fitted onto the coupling plate, or must be removed from the latter while being held with only one hand, the other being used for bolting or unbolting the axles. It is desirable, therefore, that its weight be as low as possible, and yet the leaf spring accounts for more than half of the weight of the assembly. In addition, in order to do all that is possible to prevent the leaves wearing and being corroded, these leaf springs are generously greased, and this does not make their handling easy nor especially pleasant.

Lightening of the jack cannot be contemplated at the present time and the only possibility which presents itself is replacement of the metal leaf springs with composite springs which are, at equal power, lighter in weight and which dispense with the wear and corrosion phenomena associated with metal springs.

In order to take account of the greater sensitivity of composite springs to shear stresses and to hammering pressures, the invention offers the embodiment of a device for mounting the thick end of the spring which does not give rise to shear stresses.

The device according to the invention comprises at least one loop formed at the thick end of the leaf and at least one supporting member having an at least partially cylindrical supporting surface cooperating with at least a part of the faces of the loop, the generatrices of the supporting surfaces being parallel to the axis of the loop.

The explanations and Figures which are given below by way of examples will make it possible to understand how the invention may be implemented.

FIGS. 1 and 2 show diagrammatically the stress distribution in a leaf held by a normal mounting and a leaf held by a mounting device according to the invention.

FIGS. 3 and 4 show mounting devices for an exemplary leaf, according to the invention.

FIGS. 5 and 6 show, respectively, a view from below and a view in cross-section along VI—VI in FIG. 5, of a mounting device according to another embodiment.

FIGS. 7 and 8 show two other examples of embodiment of a mounting device for an end of a composite leaf.

FIG. 1 shows the stress distribution in a leaf mounted at one of its ends and subjected to a force directed in the plane at right angles to the mounting planes. The mounted part withstands considerable shear stresses which in general are satisfactorily tolerated by metal leaves but are unacceptable for composite leaves.

In fact, the unidirectional glass fiber composites which are widely used for the production of suspension springs held by means of supports which are far apart, do not respond well to interlaminar shear and to hammering (thrust pressure) at right angles to the fibers. In addition, at equivalent stiffness, the shape which results from the use of the composite material is different from that of steel and generally requires more inertia and less width.

To reduce the shear stresses, the solution consists in taking up the mounting moment with a pair of anti-symmetrical stresses in parallel with the fibers (FIG. 2).

The magnitude of the stresses to be introduced is related to the height of the beam, while the hammering pressure is related to the width of the support. These conditions, combined with the constraints related to the edge or end stresses, lead to a design based on wrapping the strands around an inner cylindrical member (FIG. 3) for traction, and on support inside a cylindrical member or lining (FIG. 4) in the case of compression. The bottom of the lining has the twin function of transmitting stresses to the coupling axle of the spring and of maintaining the opening of the lining situated on the side of the compression loads.

Lateral stresses are taken up by supporting the lateral parts of the leaf on the sides of the opening or on thrust stops, as will be described later.

The composite leaves intended to replace the traditional leaf springs have a profile which varies, in the vertical plane of symmetry, from the thick mounting end to the thin, supple end and, in a plane at right angles to the vertical plane of symmetry, from the thin, mounting end to the wide, supple end. In fact, optimization of the stressed cross-sections in accordance with the law of bending moments involves a change in the inertias which, when combined with a cross-sectional area which is substantially constant for reasons of fiber continuity and ease of industrial implementation, leads to a height which increases towards the mounting.

Transmission of the stresses to the mounting components requires sufficient contact surface areas which lead to the fibers of the leaf being wrapped on diameters which are greater in size than the size, in the horizontal plane, of the rigid ends of the leaves. It is thus necessary to increase the size of the mounting region of the end of the leaf, depending on the ultimate use of the leaf and the magnitude of the stresses to which it is subjected. Various solutions, which will be described hereinafter, can be applied.

According to the example of embodiment shown in part in FIGS. 3, 4 and 5 and intended, for example, to be fitted to a stabilizing device, the great stiffness required in the transverse plane at right angles to the vertical plane of symmetry is incompatible with the calculated full cross-section. One solution consists in dividing the rigid end, along the vertical plane of symmetry, into two parts whose cross-sections, arranged in parallel, ensure that the required inertias and the chosen cross-section are observed. This also provides a solution to the increase in the dimensions of the mounting region and the possibility of wrapping the fibers along a surface area of a sufficient diameter.

Consequently, near the rigid end, the leaves which are designed in this manner have two profiled parts, or arms 1, 2 diverging on each side of the vertical plane of symmetry and with their ends joined in a loop 3.

Because of the divergence of the cross-sections, the stresses in the composite material occur chiefly in tension and compression and not purely in shear.

According to the embodiments shown in FIGS. 3 and 4, the mounting device consists of the loop 3 and at least one supporting member 4, 5 having an at least partially cylindrical supporting surface 6, 7 with a radius corresponding to the radius of at least a part of the inner or outer winding surface area of the loop with which it cooperates along generatrices which are parallel to the axis of the loop. The axis of the loop lies in the vertical plane of symmetry of the leaf and at right angles to the lengthwise axis of symmetry of the near end of the leaf.

Depending on whether the end of the leaf which is away from the loop is subjected to a tensile force, in addition to the flexural stress in the vertical plane of symmetry, the supporting member (FIG. 3) consists of an at least semi-cylindrical tubular component 4, arranged inside the loop, whose cylindrical part cooperates with the inner cylindrical surface part of the loop.

The tensile force applies the inner surface of the loop tightly against the surface of the supporting member 4, even in the presence of a flexural stress at right angles to the plane of the loop.

The example of embodiment according to FIG. 4 applies to a leaf subjected to a compressive force. The supporting member consists of an at least partially cylindrical component or lining 5 clamped around the end of the loop. The compressive force, whose direction is shown by the arrow, results in the cylindrical surface of the end of the loop being pressed into the lining. In addition, the lateral stresses towards the outside of the arms are taken up by supporting the lateral part of the arms on at least two rectangular supporting surfaces 8, 9 formed by the opening of the lining to enable the loop to pass through.

In the two above examples of embodiment, both the central tubular member and the peripheral lining transmit the stresses directly or indirectly to the device provided at the rigid end of the leaf.

When the leaf needs to withstand tensile and compressive stresses, the device comprises a double supporting member (FIGS. 5 and 6) consisting of a cylindrical component pierced by an axial opening 10 and having, in one of its planar faces, a coaxial annular housing 11 with a cross-section corresponding to the cross-section of the loop, at least a part of the outer wall 12 which serves as a lining being removed to enable the two arms 1, 2 of the leaf to pass through.

The replacement of the devices comprising metal leaves in a stabilizing device with a mounting device and the associated composite leaf such as described above merely requires the fitting of the axle for fixing to the coupling plate in the opening 10 and the fixing to the end of the axle of the brake for restricting rotation.

Another example of application of such an embodiment is to be found in the auxiliary landing gear of a passenger airplane. The tail wheel is mounted on a spring leaf which needs to be supple in the vertical direction and rigid in the horizontal direction. The device must be capable of becoming unlocked in the transverse direction in the event of a transverse overload.

Examples of embodiment described below can also be used in this application.

According to another embodiment, for applications in which the required inertia and the chosen cross-section of the leaf are compatible, the rigid end of the leaf is divided, along its vertical plane of symmetry, into two parallel arms (FIG. 7) 13, 14, in contact or not, joined by a loop 15 formed, as in the preceding examples, by winding the fibers around a cylindrical surface, defining a central opening. In order to avoid the detachment of the inner surface of the loop from the cylindrical fixing pivot 16 occupying the opening, two supporting members 17, 18 are provided, placed on each side of the arms 13, 14 and against the surface connecting with the loop. These members preferably have convex supporting surfaces with a radius of curvature which is approximately equal to that of the concave connecting surfaces.

According to another form of embodiment shown in FIG. 8, the rigid end of the leaf consists of two arms 19, 20, parallel or converging towards the mounting, which are joined together by a double loop 21, defining two pivot openings which are parallel and set apart by at least the thickness of the two arms 19, 20. A supporting member 24 is arranged against the outer surface of the loops, facing the arms. The supporting surface of the element in contact with the loops is shaped so that it presses against cylindrical surface portions included at least on the rear part of the loops.

The supporting member prevents the detachment of the loops and maintains a close contact with the cylindrical axles 22, 23 passing through the openings when a compressive stress is applied to the leaf.

It is obvious that the invention is not restricted to the forms of embodiment described above, but applies in all cases where it is necessary to implement the mounting with supports which are close to the end of a leaf made of a composite material. The fibrous component may be in the form of sheets of fibers, woven or nonwoven tissues of an organic or inorganic material, and is chosen as a function of the required characteristics of the resilient leaf.

I claim:

1. A device comprising in combination a resilient leaf and mounting means for mounting said resilient leaf, said leaf being made of a composite material working in flexure having, in its vertical plane of symmetry and over at least a part of its length, a thickness increasing towards one of its ends, and in its horizontal plane, a width decreasing towards the same end, the thicker end having an opening capable of cooperating with said mounting means, said opening being formed at the thick end of said leaf, the axis of the said opening being in the vertical plane of symmetry of the leaf which is in the plane of flexure in which the stresses producing the flexure are acting, said opening consisting of at least one loop formed by a winding of a fibrous component forming the leaf, and in which the mounting means consists of at least one supporting member having an at least partially cylindrical supporting surface cooperating with at least a part of the faces of the loop, the generatrices of the supporting surfaces being parallel to the axis of the loop.

2. The device as claimed in claim 1, wherein the leaf made of a composite material is divided along its vertical plane of symmetry, at least close to its thick end, into two arms which form said at least one loop.

3. The device as claimed in claim 2, wherein the arms are divergent in the direction of the loop.

4. The device as claimed in claim 2, wherein the arms are convergent in the direction of the loop.

5. The device as claimed in claim 2, wherein said at least one supporting member consists of an at least semicylindrical body with a radius corresponding to the radius of at least a part of the inner surface of the loop with which it cooperates.

6. The device as claimed in claim 5, wherein the supporting member consists of a cylindrical component pierced by an axial opening and having, in one of its planar faces, a coaxial annular housing with a cross-section corresponding to the cross-section of the loop, at least a part of the outer wall being removed to enable the arms of the component made of a composite material to pass through.

7. The device as claimed in claim 6, wherein the outer wall forms supporting surfaces for the arms in the zone where they pass through it.

8. The device as claimed in claim 5, which comprises a cylindrical pivot cooperating with the inner surface of the loop and two members arranged on each side of the arms and against the concave surfaces for connection to the loop, said members having convex supporting surfaces with a radius of curvature which is approximately equal to that of the concave surfaces of connection.

9. The device as claimed in claim 5, which comprises two cylindrical pivots cooperating with the inner surfaces of the loops and a supporting member arranged against the outer surface of the loops, facing the arms, the supporting surface of said element being shaped so that it presses against cylindrical surface portions included at least on the rear part of the loops.

10. The device as claimed in claim 2, wherein at least one supporting member consists of an at least semicylindrical member with a radius corresponding to the radius of at least a part of the outer surface of the loop with which it cooperates.

11. The device as claimed in claim 10, wherein the supporting member consists of a cylindrical component pierced by an axial opening and having, in one of its planar faces, a coaxial annular housing with a cross-section corresponding to the cross-section of the loop, at least a part of the outer wall being removed to enable the arms of the component made of a composite material to pass through.

12. The device as claimed in claim 10 which comprises a cylindrical pivot cooperating with the inner surface of the loop and two members arranged on each side of the arms and against the concave surfaces for connection to the loop, said members having convex supporting surfaces with a radius of curvature which is approximately equal to that of the concave surfaces of connection.

13. The device as claimed in claim 10, which comprises two cylindrical pivots cooperating with the inner surfaces of the loops and a supporting member arranged against the outer surface of the loops, facing the arms, the supporting surface of said element being shaped so that it presses against cylindrical surface portions included at least on the rear part of the loops.

* * * * *